Dec. 3, 1963  R. B. COLEMAN  3,113,282
PLASTIC HOUSED LEVEL INDICATOR SENDING UNITS
Filed Oct. 16, 1962

INVENTOR.
Richard B. Coleman
BY
George E. Johnson
ATTORNEY

United States Patent Office 3,113,282
Patented Dec. 3, 1963

3,113,282
PLASTIC HOUSED LEVEL INDICATOR
SENDING UNITS
Richard B. Coleman, Lansing, Mich., assignor to General Motors Corporation, Detroit, Mich., a corporation of Delaware
Filed Oct. 16, 1962, Ser. No. 230,923
7 Claims. (Cl. 338—33)

This invention relates to liquid level indicators and more particularly to sending units suitable for installation in liquid fuel tanks whereby signals may be imparted to indicators in accordance with the liquid levels obtaining.

In the field of automotive manufacture a need has arisen for a gasoline level indicator sending unit which is low in cost, light in weight, convenient for handling and installation, and also reliable in performance of its function.

An object of the present invention is to provide an improved liquid level indicator sending unit exhibiting the above referred to characteristics.

A feature of the present invention is a liquid level sending unit comprising a plastic housing, a cover and central tube, the latter being adapted to serve as a float guide, resistance support and liquid suction line.

This and other important features of the present invention will now be described in detail in the specification and then pointed out more particularly in the appended claims.

Figure 1:
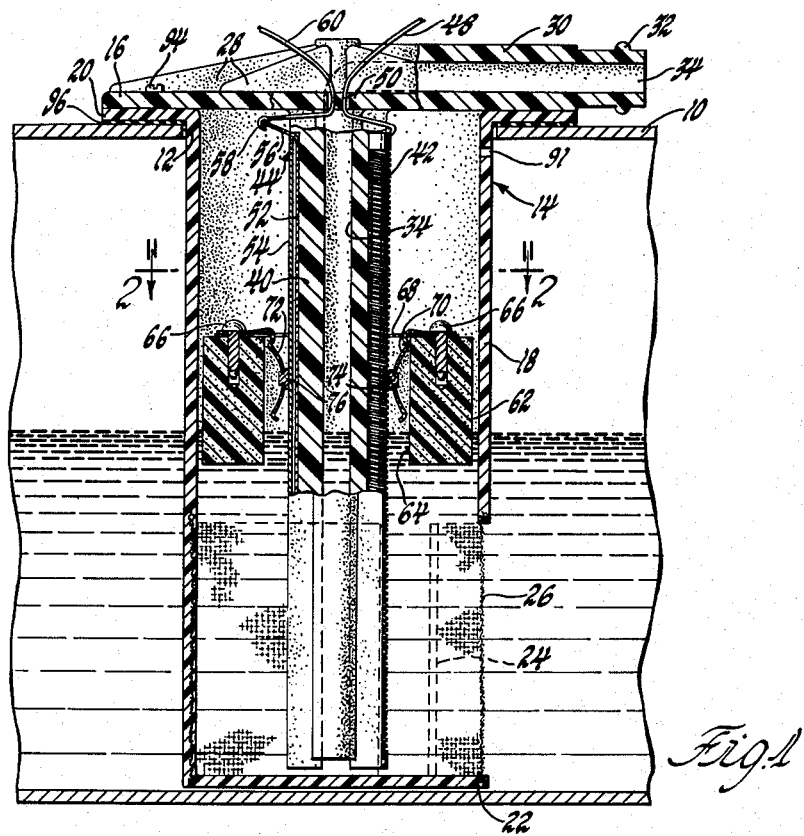
FIGURE 1 is a sectional view of a sending unit as an embodiment of the present invention and as installed in a gasoline tank.
Figure 2:
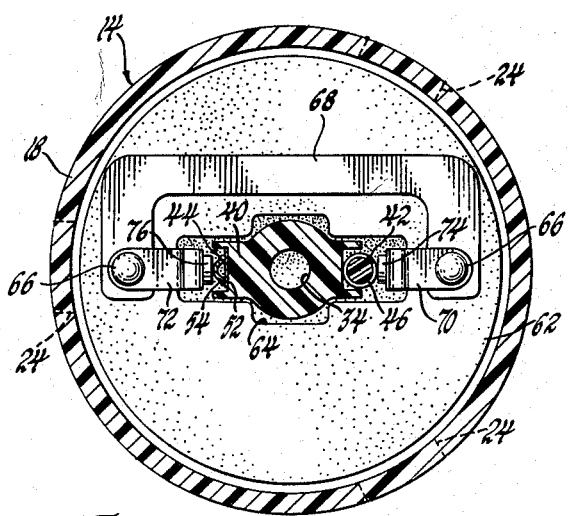
FIGURE 2 is an enlarged sectional view looking in the direction of the arrows 2—2 in FIGURE 1.

In the drawings, an automotive fuel tank is depicted at 10 and this tank is provided with an opening 12 at its top and through which is suspended a plastic housing generally indicated at 14. This housing includes a cover 16 and a cylindrical body 18 having a supporting flange 20 at its top as well as a closed bottom end 22. The lower end side wall of the cylinder body 18 is cut out in three places leaving vertical bar portions 24 retaining its integrity. The spaces between these bar portions are covered with a filter or screen material 26.

The cover 16 bears radial strengthening flanges 28 and a conduit portion 30 ridged as at 32 so that a suction line may be connected thereto. A suction passage 34 is formed in the cover and it turns downwardly at the center of the cover and extends down through the full length of a central tube 40. This tube is integral with the cover 16 and the passage 34 terminates in communication with the lower end zone of the cylinder housing portion 18.

Recessed in diagonally opposite sides of the central tube 40 are a resistance coil element 42 and a conductor strip 44. The resistance coil 42 encompasses a core 46 of insulator material and terminates near the lower end of the central tube 40. The upper end of the coil 42 is fixed to a terminal wire 48 which extends upwardly through a sealed off-center potted-in portion 50 on the cover.

The conductor strip 44 includes a flat strip of metal 52 which lies along the central tube 40 and to which strip is welded an elongated contact strip 54 of arcuate cross section. The upper end of the strip 52 as at 56 is connected at 58 to a second terminal 60. The latter extends through the cover and in insulated relation with the terminal 48.

Slidingly retained within the cylindrical housing portion 14 is a float 62. This float bears a vertically extending and irregularly shaped aperture 64 for the reception of the tube 40 and its appurtenances. Fastened to the top side of the float 62 by means of self-threading screws 66 is a bridging member 68. This bridge member includes two contact springs 70 and 72 bearing contacts 74 and 76 respectively. These contacts yieldingly rest against the resistance element 42 and the conductor strip 44 respectively.

Figure 3:
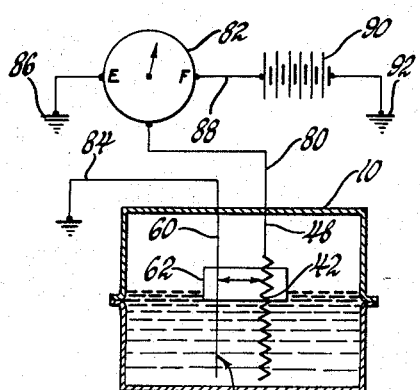
FIGURE 3 is a diagrammatic representation of the sending unit of FIGURE 1 as utilized in an indicating system.

The terminal 48 is shown in FIGURE 3 as being connected by a line 80 to an indicating instrument or fuel gage 82. The terminal 60 is shown as being grounded by a line 84. The instrument 82 is grounded as at 86 and is connected by means of a line 88 to a power supply such as a battery 90 which is connected to ground at 92. A suitable fuel gage is disclosed in the United States Patent S.N. 2,883,623, granted April 21, 1959, in the names of H. R. Hastings and C. A. Haut. Any conventional instrument will serve that will give an indication in accordance with the current signal imparted by the tank sending unit.

Liquid fuel may enter through the filter or screen 26 into the housing 14 and to prevent an air pocket within the latter, the housing is perforated as at 91.

The cover 16 with its potted terminals 48 and 60 is retained on the flange 20 by suitable fastenings such as the screw shown at 94. A sealing gasket 96 is interposed between the flange 20 and the top wall of the tank 10, and in order that a more fully complete range of level in the tank be subject to measurement, the bottom end 22 of the housing is made to extend almost to the bottom of the tank.

The cylindrical portion 18 above the housing 14 may be made of any suitable plastic material resistant to the liquid the level of which is to be indicated. A substantial number of resins are commercially available and from which the cover 16 and the housing portion 18 may be made by injection molding or by extrusion. The float 62 is preferably made of epoxy foam but obviously could be made from copper.

The resistance element 42 is preferably made of Nichrome wound wire but could be made of metal foil or film.

In operation, the float 62 will assume a position depending upon the liquid level and as a result current supplied by the battery and passing through the instrument 82 and the line 80 will be regulated by the variation in position of the contact means bridging the resistance element 42 and the conductor strip 44.

I claim:

1. A liquid level sending unit comprising a plastic housing adapted to be installed in a tank, said housing having an apertured wall and a cover, a central tube depending from the said cover and defining a suction passage and extending into said housing, a resistance element and a conducting element supported in spaced relation along said central tube, a float movable along said tube and carrying sliding contact means bridging said elements, two terminals, and each of said terminals extending through the wall of said housing and connected to one end of one of said elements.

2. A liquid level sending unit as set forth in claim 1, the said central tube being made of plastic, and said apertured wall carrying a filter through which liquid must flow to enter said suction passage.

3. A liquid level sending unit comprising a plastic housing adapted to be installed in a tank, said housing having an apertured wall and a cover, a plastic central tube integral with the said cover and defining a suction passage extending into a low zone of said housing, said housing being flanged at one end for support on said tank, a resistance element and a conducting element supported along opposite sides of said central tube, a float movable along said tube and carrying contact means, said contact means being slidable along said elements and bridging the latter, terminals extending through the wall of said housing and connected to the upper ends of said elements, and filter means retained by the wall of said housing for clarifying liquid entering said suction passage.

4. A liquid level sending unit as set forth in claim 3, said housing float and control tube being substantially coaxial.

5. A liquid level sending unit made substantially of all plastic material stable in the presence of said liquid, said unit comprising a vertical housing and a vertical suction tube enclosed in said housing, said housing being apertured for receiving liquid, a resistance element extending along said tube, a float movable along said tube and carrying a contact slidable on said resistance element and a connection to ground, and a terminal extending through the wall of said unit and connected to one end of said resistance element.

6. A liquid level sending unit as set forth in claim 5, said vertical housing having a flange by means of which said unit may be supported on the top wall of a tank.

7. A liquid level sending unit comprising an elongated housing with a cover at one end, a conduit on said cover and adapted to be connected to a suction line, a suction tube enclosed in said housing with one end of said tube connected to said conduit, the other end of said housing being apertured and having filtering means whereby filtered liquid may be received into said housing, a resistance element extending along said tube, a float movable along said tube and carrying a contact slidable on said resistance element and a connection to ground, a terminal extending into said housing and connected to one end of said resistance element, a perforation in said one end of said housing to prevent entrapment of air, and said one end of said housing being adapted to be fixed to the top wall of a tank with said housing suspended in the latter.

No references cited.